(12) United States Patent
Yamazaki

(10) Patent No.: US 9,520,958 B2
(45) Date of Patent: Dec. 13, 2016

(54) TRANSMISSION ANGLE CONTROL DEVICE, BASE STATION, TRANSMISSION ANGLE CONTROL METHOD, AND PROGRAM

(75) Inventor: Kenichirou Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 142 days.

(21) Appl. No.: 14/127,481

(22) PCT Filed: Jun. 22, 2012

(86) PCT No.: PCT/JP2012/065960
§ 371 (c)(1),
(2), (4) Date: Dec. 18, 2013

(87) PCT Pub. No.: WO2012/176867
PCT Pub. Date: Dec. 27, 2012

(65) Prior Publication Data
US 2014/0112214 A1    Apr. 24, 2014

(30) Foreign Application Priority Data

Jun. 23, 2011  (JP) ................................. 2011-139528

(51) Int. Cl.
| | |
|---|---|
| H04J 3/00 | (2006.01) |
| H04B 17/345 | (2015.01) |
| H04B 7/02 | (2006.01) |
| H04W 16/28 | (2009.01) |
| H04B 7/06 | (2006.01) |

(52) U.S. Cl.
CPC ............ *H04J 3/00* (2013.01); *H04B 7/024* (2013.01); *H04B 17/345* (2015.01); *H04W 16/28* (2013.01); *H04B 7/0617* (2013.01)

(58) Field of Classification Search
None
See application file for complete search history.

(56) References Cited

U.S. PATENT DOCUMENTS 6,487,416 B1 * 11/2002 Bundy et al. ................. 455/453
6,549,529 B1    4/2003 Drabeck et al.
(Continued)

FOREIGN PATENT DOCUMENTS

| CN | 1556560 A | 12/2004 |
|---|---|---|
| CN | 1882154 A | 12/2006 |

(Continued)

OTHER PUBLICATIONS

International Search Report dated Jul. 24, 2012 in International Patent Application Publication No. PCT/JP2012/065960.
(Continued)

*Primary Examiner* — Faruk Hamza
*Assistant Examiner* — Cassandra Decker
(74) *Attorney, Agent, or Firm* — McGinn IP Law Group, PLLC

(57) ABSTRACT

A transmission angle control device in a wireless communication system based on a TDD scheme includes: an interference signal detection unit that detects a level of interference on a second base station caused by a signal transmitted by a first base station based on a received signal received from the second base station and that outputs the interference level as an interference information signal; and a transmission angle determining unit that adjusts a transmission angle of a signal transmitted by the first base station in a vertical direction according to the interference information signal.

13 Claims, 6 Drawing Sheets

(56) References Cited

U.S. PATENT DOCUMENTS

| | | | |
|---|---|---|---|
| 7,308,285 B2 | 12/2007 | Nelson, Jr. et al. | |
| 2004/0147287 A1 | 7/2004 | Nelson, Jr. et al. | |
| 2007/0004423 A1* | 1/2007 | Gerlach et al. | 455/452.2 |
| 2007/0146228 A1* | 6/2007 | Aschermann et al. | 343/886 |
| 2007/0270155 A1 | 11/2007 | Nelson, Jr. et al. | |
| 2008/0064432 A1 | 3/2008 | Park et al. | |
| 2011/0013582 A1* | 1/2011 | Ding et al. | 370/329 |
| 2012/0252525 A1* | 10/2012 | Frenger | H04W 52/0206 455/524 |
| 2012/0282934 A1* | 11/2012 | Simonsson | H04W 72/12 455/446 |

FOREIGN PATENT DOCUMENTS

| | | |
|---|---|---|
| JP | 11-215538 A | 8/1999 |
| JP | 11-252624 A | 9/1999 |
| JP | 2000-269723 A | 9/2000 |
| JP | 2001-358651 A | 12/2001 |
| JP | 2005-525041 A | 8/2005 |
| JP | 2008-048107 A | 2/2008 |
| JP | 2008-113136 A | 5/2008 |
| JP | 2011-018966 A | 1/2011 |
| JP | 2011-071907 A | 4/2011 |
| JP | 2011-114834 A | 6/2011 |
| WO | WO 03-096560 A1 | 11/2003 |
| WO | WO 2009/110730 A2 | 9/2009 |

OTHER PUBLICATIONS

Japanese Office Action dated Sep. 30, 2014 with an English translation thereof.
European Search Report dated Nov. 27, 2014.
Chinese Office Action dated Oct. 30, 2015 with a Search Report and Japanese translation and a partial English translation thereof.

* cited by examiner

TRANSMISSION ANGLE CONTROL DEVICE, BASE STATION, TRANSMISSION ANGLE CONTROL METHOD, AND PROGRAM

REFERENCE TO RELATED APPLICATION

The present invention is based upon and claims the benefit of the priority of Japanese patent application No. 2011-139528 filed on Jun. 23, 2011, the disclosure of which is incorporated herein in its entirety by reference thereto.

TECHNICAL FIELD

The present invention relates to a transmission angle control device, base station, transmission angle control method, and program, and particularly to a transmission angle control device, base station comprising the same, transmission angle control method, and program that control the transmission angle of a transmitted signal in a wireless communication system using a TDD (Time Division Duplex) scheme as the duplex scheme thereof.

BACKGROUND

In a wireless communication system based on the TDD scheme, the same frequency is used for uplink and downlink communication. FIG. 1 is a drawing showing a configuration example of a transmitted/received frame in the TDD scheme. In the TDD scheme, as the transmitted/received frame 101 of a base station A shown in FIG. 1, a frame is utilized for communication while being divided into DL (Downlink) transmission, guard time, and UL (Uplink) reception. Here, the guard time is a time interval provided so as to prevent interference from occurring when DL transmission is switched to UL reception or vice versa. The ratios between DL transmission, guard time, and UL reception within a transmitted/received frame can be adjusted to optimum ratios according to the degree of congestion in the uplink and downlink traffic of each base station.

Patent Literature 1 describes a technology that sets the angle of an antenna so as to decrease interference to adjacent cells in the TDD scheme.

Japanese Patent Kohyo Publication No. JP-P2005-525041A

SUMMARY

The following analysis is given by the present inventor.

As shown in FIG. 1, when the transmitted/received frame 101 of the base station A and a transmitted/received frame 102 of a base station B have different ratios of DL transmission and UL reception, interference from the base station B to the base station A occurs due to the fact that a DL transmission section of the base station B overlaps a UL reception section of the base station A, degrading the quality of the UL reception at the base station A.

FIG. 2 is a drawing for explaining problems in a conventional wireless communication system based on the TDD scheme. Here, as an example, assumed is a case where base stations A201 and B202 are provided and terminal stations A203 and B204 communicating with the corresponding base stations are provided, as shown in FIG. 2.

During the overlapping section shown in FIG. 1 between the DL transmission section of the base station B202 and the UL reception section of the base station A201, the base station A201 receives an uplink signal from the terminal station A203 during the UL reception section, and the base station B202 transmits an downlink signal to the terminal station B204 during the DL transmission section. At this time, the downlink signal from the base station B202 is received by the base station A201, causing interference, and the reception quality of the uplink signal from the terminal station A203, which is a desired signal, deteriorates. Such interference is caused by the facts that base stations, generally built on a height with a good view, can transmit/receive radio waves to/from a distant place and that the transmission power of base stations is greater than the transmission power of terminal stations.

On the other hand, even when the base stations A201 and B202 have the same ratio of DL transmission and UL reception in a transmitted/received frame, interference from the base station B202 to the base station A201 may similarly occur, degrading the reception quality.

This will be explained with reference to FIG. 3. FIG. 3 is a drawing showing a configuration example of a transmitted/received frame in the TDD scheme. As stated above, since base stations are generally built on a height with a good view and can transmit/receive radio waves to/from a distant place, radio waves from the base station B202 may be able to reach the base station A201 even when the base station B202 is located in a distance place.

At this time, the signal from the base station B202 to the base station A201 reaches the base station A201 with a propagation delay corresponding to the distance between the base stations B202 and A201. As a result, even in the case where the base stations have the same ratio between DL transmission and UL reception in a transmitted/received frame, if the propagation delay is larger than the guard time, the DL transmission section of the base station B202 will overlap the UL reception section of the base station A201, causing interference and degrading the reception quality.

As a countermeasure against the problem above, the interference can be reduced by decreasing the transmission power of the interfering base station. For instance, in FIG. 2, the transmission power of the base station B202, which interferes with the base station A201, needs to be decreased so that the DL signal transmitted from the base station B202 does not reach the base station A201.

However, such a method may reduce the communication service area served by the base station B202. In other words, by decreasing the transmission power of the base station B202, the communication service area of the base station B202 is reduced and terminal stations outside the communication service area may not be able to communicate with the base station B202.

As described, a wireless communication system based on the TDD scheme has the problem that the communication service area becomes restricted when the transmission power is decreased in order to prevent interference between different base stations.

Patent Literature 1 describes a technology in which a user device controls a radio wave transmission angle in the horizontal direction to reduce interference to other base stations. If this method is applied to a base station, the radio wave transmission angle will be controlled in the horizontal direction so as not to interfere with other base stations. However, when such a method is employed, the base station is not able to communicate with terminal stations locating in the same direction as the other base stations even if they are within the base station's own communication area.

Therefore, there is a need in the art to have a base station device reduce interference signals affecting another base station while allowing the base station to communicate with a terminal station within the area of the base station in a wireless communication system based on the TDD scheme.

According to a first aspect of the present invention, there is provided a transmission angle control device in a wireless communication system based on a TDD (Time Division Duplex) scheme. The transmission angle control device comprises: an interference signal detection unit that detects a level of interference on a second base station caused by a signal transmitted by a first base station based on a received signal received from the second base station and that outputs the interference level as an interference information signal; and a transmission angle determining unit that adjusts a transmission angle of a signal transmitted by the first base station in a vertical direction according to the interference information signal.

According to a second aspect of the present invention, there is provided a base station comprising the transmission angle control device according to the first aspect. Further, there is provided a wireless communication system comprising the base station.

According to a third aspect of the present invention, there is provided a transmission angle control method in a wireless communication system based on a TDD (Time Division Duplex) scheme. The transmission angle control method comprises: detecting a level of interference on a second base station caused by a signal transmitted by a first base station based on a received signal received from the second base station; and adjusting a transmission angle of a signal transmitted by the first base station in a vertical direction according to the interference level.

According to a fourth aspect of the present invention, there is provided a program causing a computer provided in a first base station in a wireless communication system based on a TDD (Time Division Duplex) scheme to execute: detecting a level of interference on a second base station caused by a signal transmitted by the first base station based on a received signal received from the second base station; and adjusting a transmission angle of a signal transmitted by the first base station in a vertical direction according to the interference level.

Further, the program can be provided as a program product stored in a non-transitory computer-readable storage medium.

The present invention provides the following advantage, but not restricted thereto. According to the transmission angle control device, base station, transmission angle control method and program relating to the present invention, it becomes possible for a first base station device to reduce interference signals affecting a second base station while allowing the first base station device to communicate with a terminal station within the area of the first base station device in a wireless communication system based on a TDD scheme.

PREFERED MODES

In the present disclosure, there are various possible modes, which include the following, but not restricted thereto. First, a summary of the present invention will be given. Note that drawing reference signs in the summary are illustrated examples solely for facilitating understanding and are not intended to limit the present invention to illustrated examples.

When a first base station used in a wireless communication system using a TDD (Time Division Duplex) scheme as the duplex scheme thereof interferes with a second base station, the present invention reduces the interference to the second base station by controlling the radio wave transmission angle of the first base station so as to point downward based on an interference information signal transmitted from the second base station.

Figure 4:
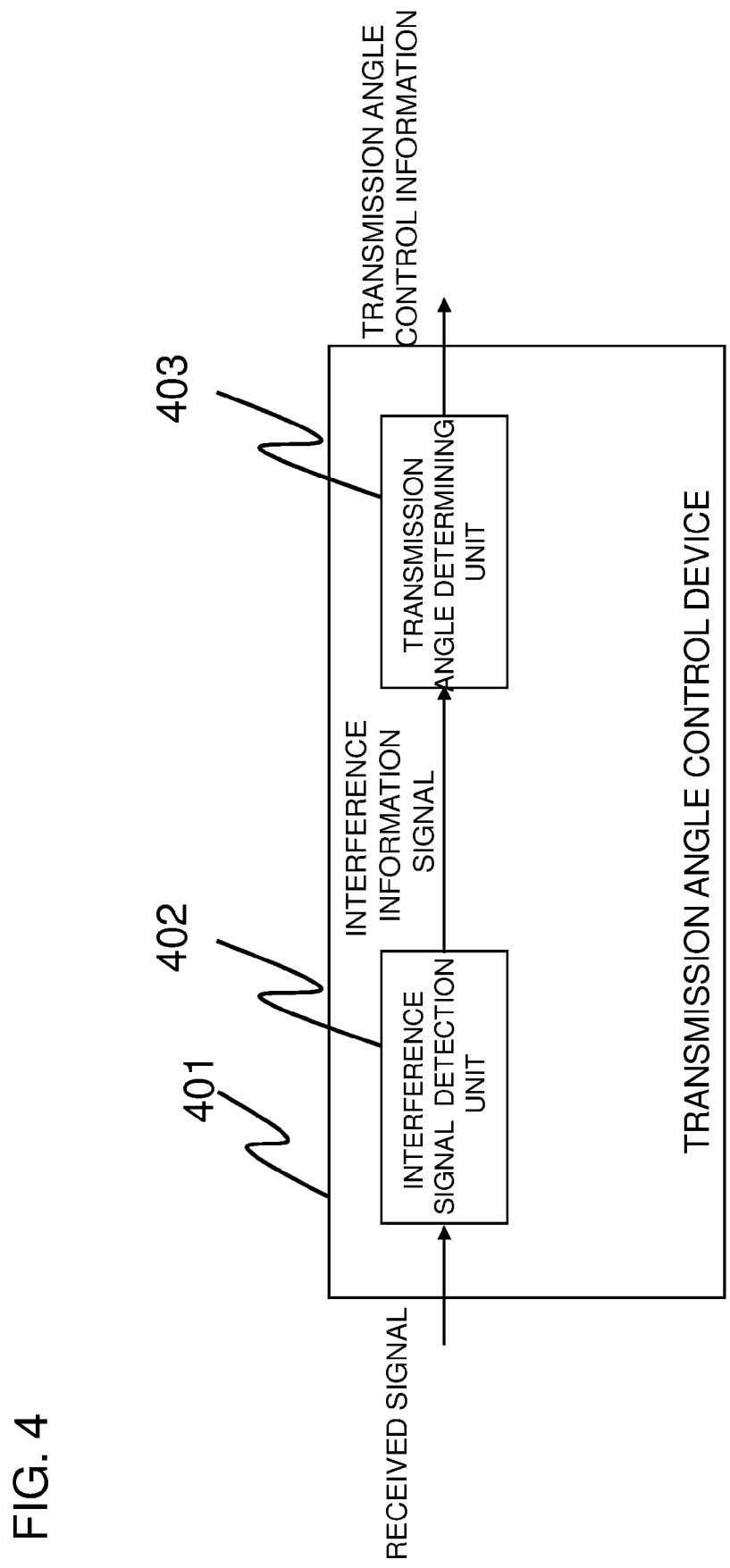
FIG. 4 is a block diagram showing a configuration of a transmission angle control device relating to a first exemplary embodiment.

With reference to FIG. 4, an interference signal detection unit 402 receives a signal received by its own base station (the base station B202 in FIG. 2), demodulates an interference information signal transmitted from another base station (the base station A201 in FIG. 2), and outputs the result to a transmission angle determining unit 403. The transmission angle determining unit 403 determines the radio wave transmission angle of its own base station (the base station B202 in FIG. 2) based on the interference information signal, and controls the radio wave transmission angle of its own base station (the base station B202 in FIG. 2) by outputting transmission angle control information.

Figure 1:
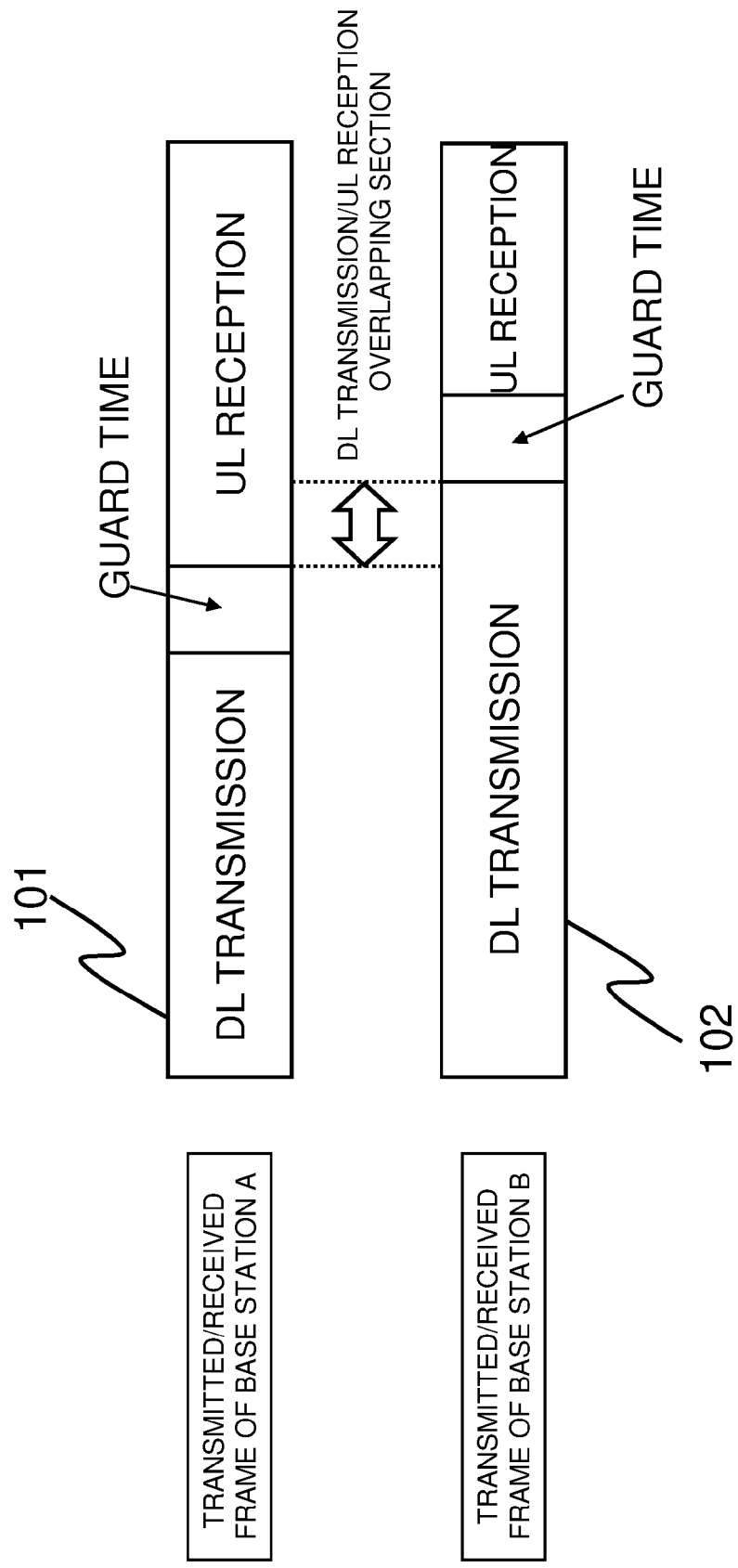
FIG. 1 is a drawing showing a configuration example of a transmitted/received frame in a TDD scheme.
Figure 2:
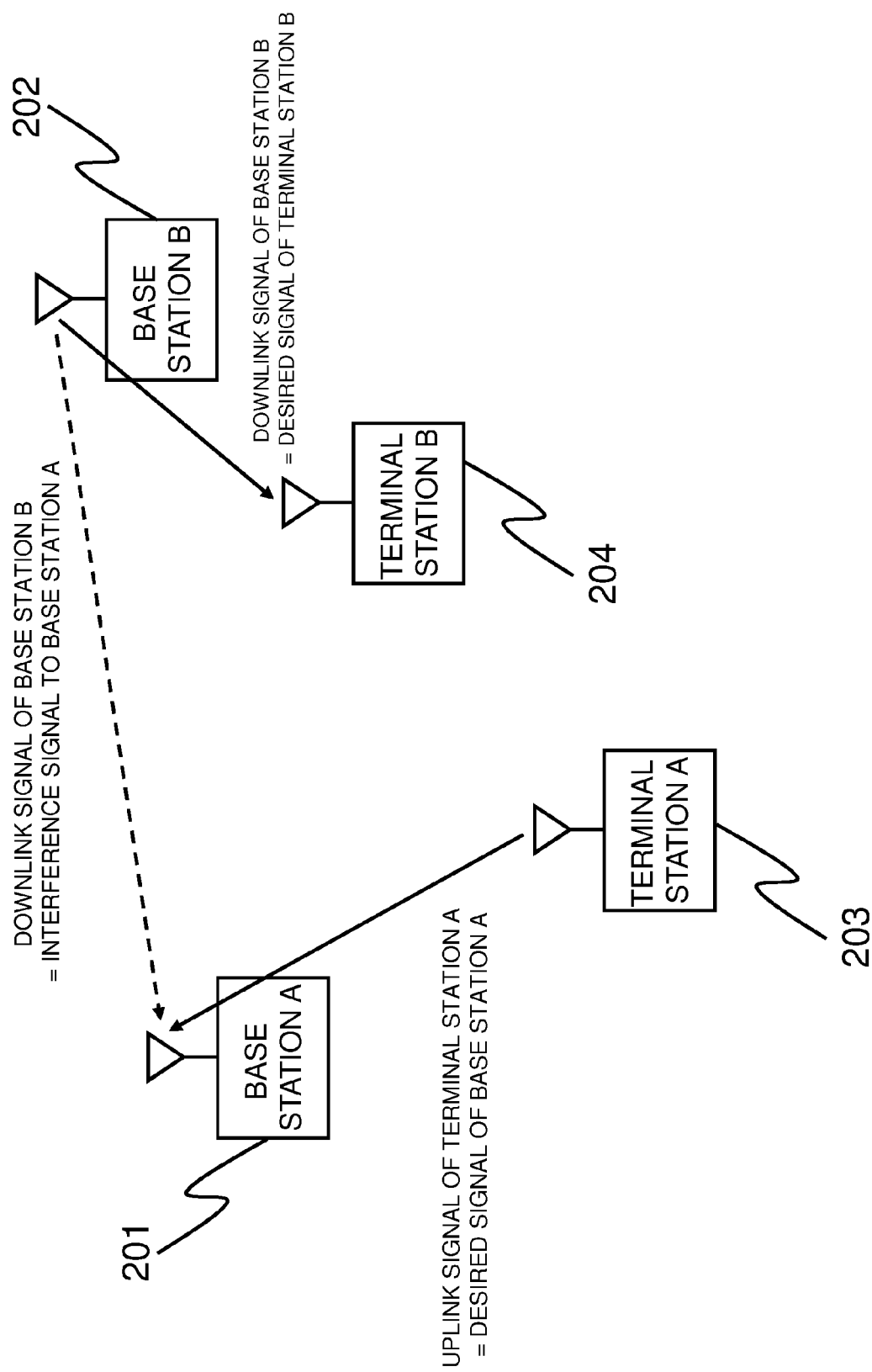
FIG. 2 is a drawing for explaining problems in a wireless communication system based on a TDD scheme.
Figure 3:
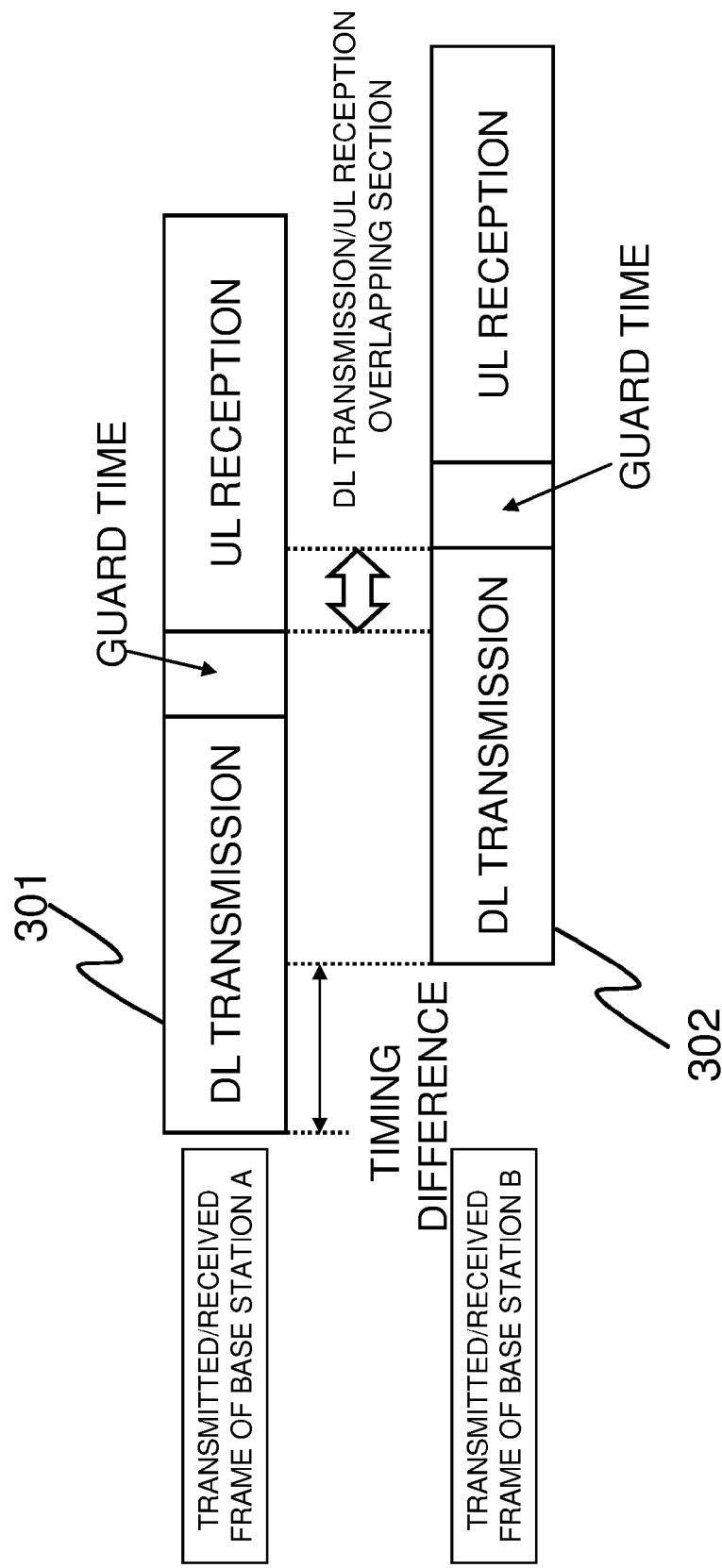
FIG. 3 is a drawing showing a configuration example of a transmitted/received frame in a TDD scheme.

As described, since the radio wave transmission angle of its own base station (the base station B202 in FIG. 2) is controlled based on the interference information signal transmitted from another base station (the base station A201 in FIG. 2), it becomes possible to reduce the interference to another base station (the base station A201 in FIG. 2) without decreasing the transmission power of its own base station (the base station B202 in FIG. 2).

In the present invention, the following modes are possible.
(Mode 1)
A transmission angle control device may be the transmission angle control device according to the first aspect.
(Mode 2)
The transmission angle determining unit may adjust the transmission angle downward when the interference level is not less than a predetermined threshold value.
(Mode 3)
The transmission angle determining unit may maintain the transmission angle or adjust the transmission angle upward when the interference level is less than a predetermined threshold value.
(Mode 4)
The received signal may be a level of interference on the second base station caused by a signal transmitted by the first base station and include information indicating an interference level detected by the second base station.
(Mode 5)
By deeming that a level of interference on the second base station caused by a signal transmitted by the first base station is equal to a level of interference on the first base station caused by a signal transmitted by the second base station, the interference signal detection unit may estimate these interference levels based on the received signal, and output estimated interference levels as the interference information signal.

(Mode 6)

The transmission angle determining unit may adjust the transmission angle of a signal transmitted by the first base station in a vertical direction by referring to a table that associates an interference level with a transmission angle in a vertical direction.

(Mode 7)

There is provided a base station comprising the transmission angle control device described above. Further, there is provided a wireless communication system comprising the base station and based on a TDD scheme.

(Mode 8)

A transmission angle control method may be the transmission angle control method according to the third aspect.

(Mode 9)

The adjusting may comprise adjusting the transmission angle downward when the interference level is not less than a predetermined threshold value.

(Mode 10)

The adjusting may comprise maintaining the transmission angle or adjusting the transmission angle upward when the interference level is less than a predetermined threshold value.

(Mode 11)

The received signal may be a level of interference on the second base station caused by a signal transmitted by the first base station and include information indicating an interference level detected by the second base station.

(Mode 12)

The detecting may comprise, by deeming that a level of interference on the second base station caused by a signal transmitted by the first base station is equal to a level of interference on the first base station caused by a signal transmitted by the second base station, estimating these interference levels based on the received signal.

(First Exemplary Embodiment)

Transmission angle control relating to a first exemplary embodiment will be described with reference to the drawings. FIG. 4 is a block diagram showing a configuration of a transmission angle control device 401 relating to the present exemplary embodiment. With reference to FIG. 4, the transmission angle control device 401 comprises the interference signal detection unit 402 and the transmission angle determining unit 403. In the example of FIG. 2, the transmission angle control device 401 is built into the base station B202 interfering with the base station A201.

The interference signal detection unit 402 demodulates an interference information signal transmitted from another base station (the base station A201 in FIG. 2) and outputs the result to the transmission angle determining unit 403. The transmission angle determining unit 403 determines the radio wave transmission angle of its own base station (the base station B202 in FIG. 2) based on the interference information signal, and controls the radio wave transmission angle of its own base station (the base station B202 in FIG. 2) by outputting the transmission angle control information.

The interference information signal transmitted from another base station (the base station A201 in FIG. 2) and demodulated by the interference signal detection unit 402 includes information on the interference to another base station, and is transmitted from another base station (the base station A201 in FIG. 2) according to a predetermined format. More concretely, the interference information indicates the absolute amount of the interference. The interference information signal transmitted from another base station (the base station A201 in FIG. 2) may be transmitted in a wired or wireless fashion.

The transmission angle control information generated and outputted by the transmission angle determining unit 403 is required for having a transmission angle control unit (not shown in the drawing) in a subsequent stage electrically control the transmission angle, and indicates a transmission angle for shifting the feed phase of each transmission antenna element by a predetermined amount. More concretely, the transmission angle control information may be determined according to a table predetermined by the levels of the interference amount.

The configuration of the present exemplary embodiment has been described above, but another base station's function of generating the interference information signal will be omitted since it is not directly related to the present invention. Further, for instance, a publicly known control unit can be used as the transmission angle control unit, but a detailed configuration will be omitted since it is also unrelated to the present invention.

Further, in the present exemplary embodiment, the interference information signal indicates the absolute amount of interference, however, it may be information on whether or not interference exists, or interference information divided into a predetermined plurality of interference levels.

Further, the transmission angle control information is determined according to a table predetermined by the levels of the interference amount, but it may be determined so that the transmission angle points downward by a predetermined angle when interference exists. Further, it may be determined so that the transmission angle is not changed or the transmission angle points upward by a predetermined angle when no interference exists.

Further, the transmission angle control device (not shown in the drawing) electrically controls the transmission angle, but the antenna angle may be mechanically controlled.

Figure 5:
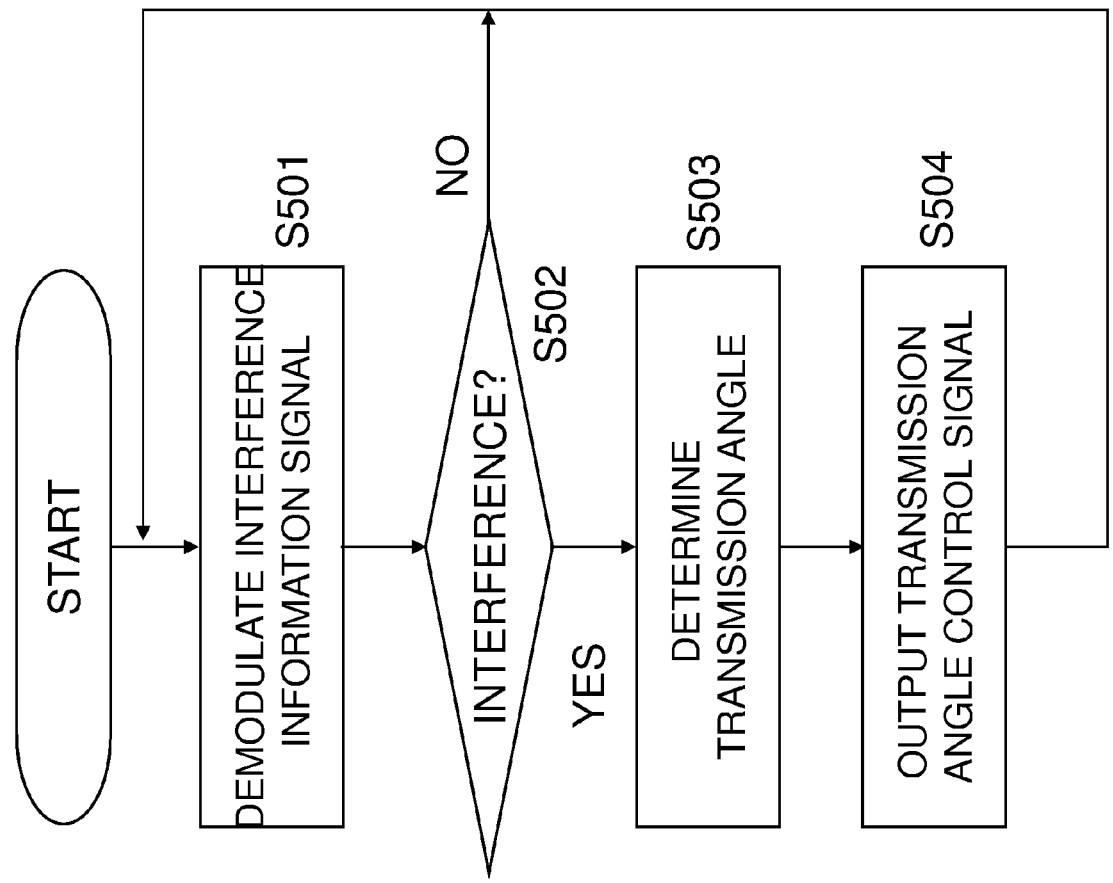
FIG. 5 is a flowchart showing an operation example of the transmission angle control device relating to the first exemplary embodiment.

FIG. 5 is a flowchart showing an operation example of the transmission angle control device 401 relating to the present exemplary embodiment. With reference to the flowchart in FIG. 5, the operation of the transmission angle control device 401 in FIG. 4 will be described.

With reference to FIG. 5, upon demodulating the interference information signal, the interference signal detection unit 402 outputs the interference information signal to the transmission angle determining unit 403 (step S501). The transmission angle determining unit 403 determines the presence of interference based on the interference information signal (step S502). If interference exists (YES in the step S502), the transmission angle is determined (step S503) and a transmission angle control signal is outputted (step S504). Then, the demodulation of the interference information signal by the interference signal detection unit 402 (the step S501) and the processing steps thereafter are repeated.

Meanwhile, when the transmission angle determining unit 403 determines that no interference exists (NO in the step S502), the operation returns to the processing of the interference signal detection unit 402, and the demodulation of the interference information signal (the step S501) and the processing steps thereafter are repeated.

Further, in the case where the transmission angle points upward by a predetermined angle when no interference exists, the transmission angle determining unit 403 determines the transmission angle so that the transmission angle points upward by a predetermined angle (the step S503)

without determining whether or not interference exists, and outputs the transmission angle control signal (the step S504).

According to the present exemplary embodiment, the following effects can be obtained.

As the first effect, when a first base station is interfering with a second base station, since the radio wave transmission angle of the first base station is controlled so as to point downward, it is not necessary to decrease the transmission power of the base station, and the communication service area can be expanded, compared with a case where the transmission power is decreased.

As the second effect, when the first base station is not interfering with the second base station, since the radio wave transmission angle of the first base station is controlled so as to point upward, the communication service area can be expanded.

(Second Exemplary Embodiment)

A transmission angle control device relating to a second exemplary embodiment will be described with reference to the drawings. In the first exemplary embodiment, the radio wave transmission angle of the first base station (the base station B202 in FIG. 2) is controlled based on the interference information signal transmitted from the second base station (the base station A201 in FIG. 2). Meanwhile, in the present exemplary embodiment, the radio wave transmission angle is controlled based on the amount of interference the first base station (the base station B202 in FIG. 2) receives from the second base station (the base station A201 in FIG. 2). This is based on a concept that the amount of interference the first base station (the base station B202 in FIG. 2) receives from the second base station (the base station A201 in FIG. 2) is equal to the amount of interference that the first base station (the base station B202 in FIG. 2) gives to the second base station (the base station A201 in FIG. 2).

Figure 6:
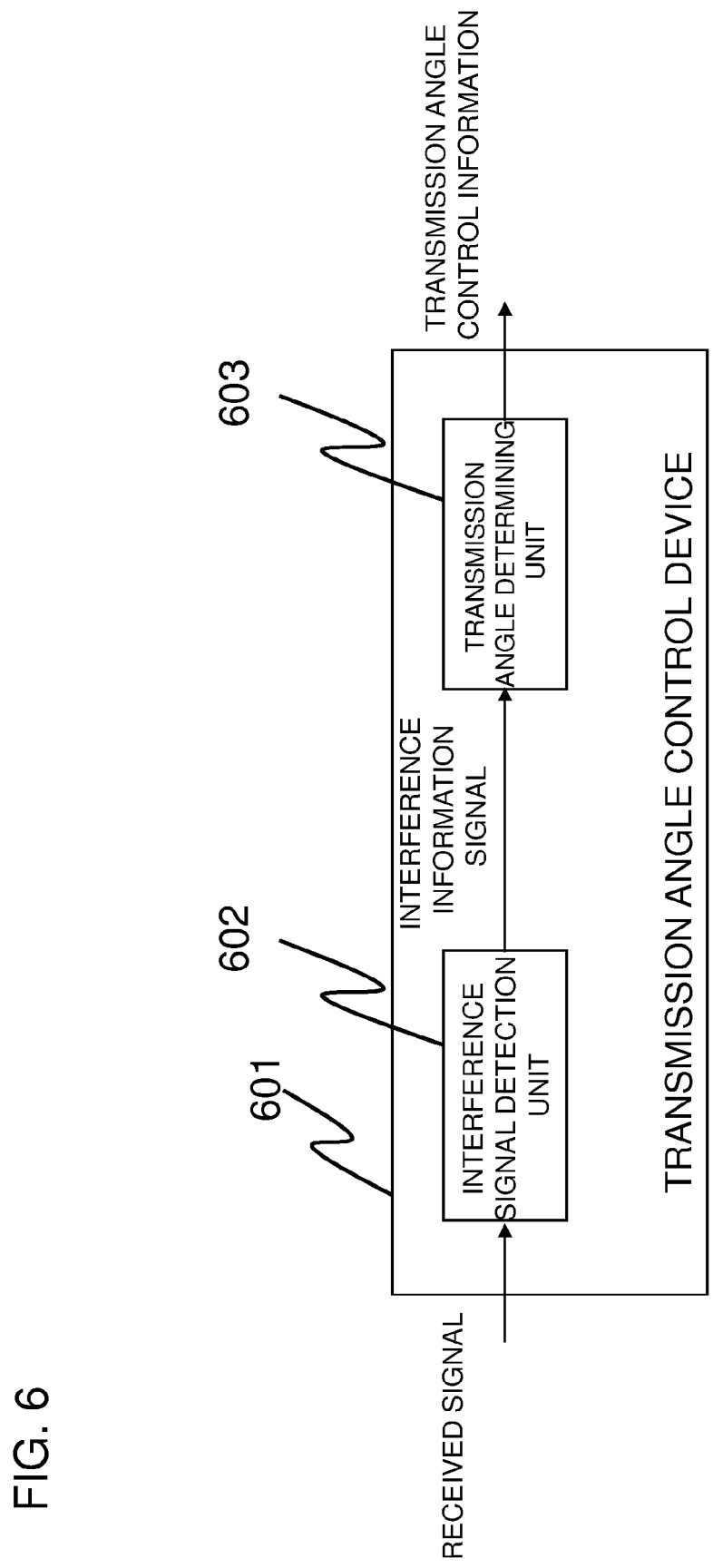
FIG. 6 is a block diagram showing a configuration of a transmission angle control device relating to a second exemplary embodiment.

FIG. 6 is a block diagram showing a configuration example of the transmission angle control device 601 relating to the present exemplary embodiment. With reference to FIG. 6, the transmission angle control device 601 comprises an interference signal detection unit 602 and a transmission angle determining unit 603.

The interference signal detection unit 602 receives a signal received by its own base station (the base station B202 in FIG. 2) and detects a signal level arriving from another base station (the base station A201 in FIG. 2), i.e., an interference signal level. For instance, the interference signal detection unit 602 detects the interference signal level based on the correlation processing using a unique pilot signal used by another base station (the base station A201 in FIG. 2). The interference signal detection unit 602 outputs this interference signal level to the transmission angle determining unit 603 as the interference information signal.

Since the operation of the transmission angle determining unit 603 is identical to the transmission angle determining unit 403 in the transmission angle control device (FIG. 4) relating to the first exemplary embodiment, the explanation will be omitted.

According to the transmission angle control device 601 of the present exemplary embodiment, the radio wave transmission angle of its own base station (the base station B202 in FIG. 2) can be controlled even when the interference information signal is not transmitted from another base station (the base station A201 in FIG. 2).

Further, each disclosure of the prior art documents such as Patent Literature listed above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters And/or items may fall under the modifications aforementioned.

101, 102: transmitted/received frame
201: base station A
202: base station B
203: terminal station A
204: terminal station B
301, 302: transmitted/received frame
401: transmission angle control device
402: interference signal detection unit
403: transmission angle determining unit
601: transmission angle control device
602: interference signal detection unit
603: transmission angle determining unit

What is claimed is:

1. A transmission angle control device disposed on a first base station in a wireless communication system based on a TDD (Time Division Duplex) scheme, the transmission angle control device comprising:
    a computer readable storage medium storing program instructions; and
    a processor executing the program instructions, the processor configured to:
    detect a level of interference on a second base station caused by a signal transmitted by the first base station based on a received signal received from the second base station and output the interference level as an interference information signal; and
    adjust a transmission angle of a signal transmitted by the first base station in a vertical direction according to the interference information signal indicative of the level of interference caused by the first base station on the second base station,
    wherein the adjusting includes adjusting the transmission angle downward when the interference level is not less than a predetermined threshold value, and
    wherein the adjusting includes maintaining the transmission angle or adjusting the transmission angle upward when the interference level is less than a predetermined threshold value.

2. The transmission angle control device according to claim 1, wherein the received signal indicates the level of interference on the second base station caused by the signal transmitted by the first base station and includes information indicating the level of interference detected by the second base station.

3. The transmission angle control device according to claim 1, wherein the detecting comprises estimating the level of interference based on the received signal by deeming that the level of interference on the second base station caused by the signal transmitted by the first base station is equal to a second level of interference on the first base station caused by the received signal received from the second base station.

4. The transmission angle control device according to claim 1, wherein the adjusting includes adjusting the transmission angle of the signal transmitted by the first base station in a vertical direction by referring to a table that associates an interference level with a transmission angle in the vertical direction.

5. A base station comprising the first base station comprising the transmission angle control device according to claim 1.

6. The transmission angle control device according to claim 1, wherein the level of interference comprises a level of downlink interference on the second base station caused by the signal transmitted by the first base station.

7. The transmission angle control device according to claim 1, further comprising a computer including the processor and the computer readable storage medium, the computer readable storage medium being non-transitory.

8. A transmission angle control method in a wireless communication system based on a TDD (Time Division Duplex) scheme, the method comprising:
   detecting a level of interference on a second base station caused by a signal transmitted by a first base station based on a received signal received from the second base station; and
   adjusting a transmission angle of a signal transmitted by the first base station in a vertical direction according to the level of interference caused by the first base station on the second base station,
   wherein the adjusting includes adjusting the transmission angle downward when the interference level is not less than a predetermined threshold value, and
   wherein the adjusting includes maintaining the transmission angle or adjusting the transmission angle upward when the interference level is less than a predetermined threshold value.

9. The transmission angle control method according to claim 8, wherein the received signal indicates the level of interference on the second base station caused by the signal transmitted by the first base station and includes information indicating the level of interference detected by the second base station.

10. The transmission angle control method according to claim 8, wherein the detecting comprises estimating the level of interference based on the received signal by deeming that the level of interference on the second base station caused by the signal transmitted by the first base station is equal to a second level of interference on the first base station caused by the received signal received from the second base station.

11. A non-transitory computer-readable recording medium, storing a program that causes a computer provided in a first base station in a wireless communication system based on a TDD (Time Division Duplex) scheme to execute:
   detecting a level of interference on a second base station caused by a signal transmitted by the first base station based on a received signal received from the second base station; and
   adjusting a transmission angle of a signal transmitted by the first base station in a vertical direction according to the level of interference caused by the first base station on the second base station,
   wherein the adjusting includes adjusting the transmission angle downward when the interference level is not less than a predetermined threshold value, and
   wherein the adjusting includes maintaining the transmission angle or adjusting the transmission angle upward when the interference level is less than a predetermined threshold value.

12. The non-transitory computer-readable recording medium according to claim 11, wherein the received signal indicates the level of interference on the second base station caused by the signal transmitted by the first base station and includes information indicating the level of interference detected by the second base station.

13. The non-transitory computer-readable recording medium according to claim 11, wherein the detecting comprises estimating the level of interference based on the received signal by deeming that the level of interference on the second base station caused by the signal transmitted by the first base station is equal to a second level of interference on the first base station caused by the received signal received from the second base station.

* * * * *